(12) United States Patent
Ishii

(10) Patent No.: US 8,054,508 B2
(45) Date of Patent: Nov. 8, 2011

(54) IMAGE PROCESSING APPARATUS, METHOD, AND COMPUTER PROGRAM PRODUCT THAT GENERATES AND ENCODES COUPLED INFORMATION IDENTIFYING IMAGE COPYING AND PROCESSING DEVICES

(75) Inventor: Masaki Ishii, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 588 days.

(21) Appl. No.: 12/076,394

(22) Filed: Mar. 18, 2008

(65) Prior Publication Data

US 2008/0231907 A1    Sep. 25, 2008

(30) Foreign Application Priority Data

Mar. 19, 2007  (JP) ................. 2007-071008

(51) Int. Cl.
 *H04N 1/44* (2006.01)
 *G06K 19/06* (2006.01)
 *B41M 3/10* (2006.01)
 *B41M 3/14* (2006.01)
(52) U.S. Cl. .................... 358/3.28; 358/1.14
(58) Field of Classification Search .......... 358/3.28, 358/1.14, 1.15, 1.18, 537, 452; 283/72, 113; 235/487, 494
 See application file for complete search history.

(56) References Cited

U.S. PATENT DOCUMENTS

| 5,671,277 | A | 9/1997 | Ikenoue et al. | |
| 5,987,127 | A | 11/1999 | Ikenoue et al. | |
| 6,603,864 | B1 * | 8/2003 | Matsunoshita | 382/100 |
| 6,738,491 | B1 | 5/2004 | Ikenoue et al. | |
| 7,006,660 | B2 * | 2/2006 | Hayashi | 382/100 |
| 7,007,167 | B2 * | 2/2006 | Kurahashi | 713/176 |
| 7,050,604 | B2 * | 5/2006 | Fujihara et al. | 382/100 |
| 7,058,198 | B1 * | 6/2006 | Miyashita | 358/3.28 |
| 7,266,215 | B2 | 9/2007 | Ikenoue et al. | |
| 7,287,284 | B2 * | 10/2007 | Hayashi | 726/32 |
| 7,298,511 | B2 * | 11/2007 | Lay et al. | 358/1.15 |
| 7,388,965 | B2 | 6/2008 | Ikenoue | |
| 7,463,752 | B2 | 12/2008 | Ikenoue | |
| 7,536,026 | B2 * | 5/2009 | Kaneda et al. | 382/100 |
| 2002/0061122 | A1 * | 5/2002 | Fujihara et al. | 382/100 |
| 2002/0062442 | A1 * | 5/2002 | Kurahashi | 713/176 |
| 2004/0148507 | A1 * | 7/2004 | Iwamura et al. | 713/176 |
| 2004/0258276 | A1 | 12/2004 | Ishii et al. | |
| 2005/0152006 | A1 | 7/2005 | Abe et al. | |
| 2005/0200910 | A1 * | 9/2005 | Kanoshima et al. | 358/448 |

(Continued)

FOREIGN PATENT DOCUMENTS

JP    06-022119    1/1994

(Continued)

OTHER PUBLICATIONS

Machine translation of JPO search report for Japanese patent application No. 2007-071008.*
Applicants enclose an English Language Abstract of Japanese Patent Publication No. JP 2003-101762 dated Apr. 4, 2003.
Applicants enclose an English Language Abstract of Japanese Patent Publication No. JP 06-231466 dated Aug. 19, 1994.
Office Action dated May 2, 2011 for corresponding Japanese patent application No. 2007-071008.

*Primary Examiner* — Scott A Rogers

(74) *Attorney, Agent, or Firm* — Harness, Dickey & Pierce, P.L.C.

(57) ABSTRACT

An image processing apparatus includes an image acquiring unit that acquires an original image data containing first data, and a data processing unit that edits the first data in the original image data thereby generating edited original image data, and outputs the edited original image data.

14 Claims, 9 Drawing Sheets

U.S. PATENT DOCUMENTS

| | | |
|---|---|---|
| 2005/0207613 A1* | 9/2005 | Kawakami ............... 382/100 |
| 2005/0276439 A1 | 12/2005 | Ishii |
| 2006/0087689 A1* | 4/2006 | Hayashi et al. ........... 358/1.15 |
| 2006/0164693 A1 | 7/2006 | Matsumoto et al. |
| 2006/0193525 A1 | 8/2006 | Ishii |
| 2006/0210193 A1 | 9/2006 | Ishii |
| 2006/0238824 A1* | 10/2006 | Otake et al. ............... 358/448 |
| 2007/0041628 A1* | 2/2007 | Fan ........................... 382/135 |
| 2007/0097413 A1* | 5/2007 | Nakai et al. ............... 358/1.14 |
| 2007/0153303 A1 | 7/2007 | Abe et al. |
| 2007/0206229 A1 | 9/2007 | Ishii |
| 2007/0217651 A1 | 9/2007 | Ishii |
| 2008/0144115 A1 | 6/2008 | Ishii et al. |

FOREIGN PATENT DOCUMENTS

| | | |
|---|---|---|
| JP | 2833975 | 10/1998 |
| JP | 2003-283797 | 10/2003 |
| JP | 2004-080136 | 3/2004 |
| JP | 2004-336219 | 11/2004 |
| JP | 3628312 | 12/2004 |

* cited by examiner

GENERATE INTERMEDIATE IMAGE

IMAGE PROCESSING APPARATUS, METHOD, AND COMPUTER PROGRAM PRODUCT THAT GENERATES AND ENCODES COUPLED INFORMATION IDENTIFYING IMAGE COPYING AND PROCESSING DEVICES

CROSS-REFERENCE TO RELATED APPLICATIONS

The present application claims priority to and incorporates by reference the entire contents of Japanese priority document 2007-071008 filed in Japan on Mar. 19, 2007.

BACKGROUND OF THE INVENTION

1. Field of the Invention

The present invention relates to an image processing apparatus, an image processing method, and a computer program product.

2. Description of the Related Art

A technology for embedding various data in an original image when outputting the original image on a recording medium is widely used in image processings. Examples of data to be embedded into an original image include data on protection of security or contents of the original image, and data for associating the contents of the original image with web pages. Such data is generally embedded as various patterns in an image.

Barcodes are widely known as examples of such patterns. However, barcodes are disadvantageous in that it is necessary to have a space for placing a barcode in the original image, and it is difficult to maintain security of data encoded in the barcode because the barcode may be cut off from the original image. As countermeasures to such situations, conventional technologies for arranging faint background patterns on the original image instead of barcodes are known.

For example, Japanese Patent No. 2833975 discloses dot codes for embedding additional information in an original image. A dot code is formed by a plurality of blocks, each having base points called "marker" in every corner of the block, and dot images indicative of information are arranged inside the block. Furthermore, Japanese Patent No. 3628312 discloses a faint-image embedding apparatus and a faint-image detecting apparatus. The faint-image embedding apparatus can add confidential data in non-text format to a text image. The faint-image detecting apparatus can detect confidential data from a printed document. Moreover, Japanese Patent Application Laid-Open No. 2004-336219 discloses a conventional technology for retrieving embedded data from an original image. In the conventional technology, two-dimensional patterns formed by slash and backslash are embedded as background images in the original image.

However, the conventional technologies are only for embedding data in an image to be output, and not for editing such embedded data (deletion or change of contents of data). For example, while it is required to retrieve data for identifying a printed object that is embedded in an original, it is also required to prevent the data from being retrieved from copies of the original. In this case, the data on the copies needs to be deleted therefrom. Furthermore, when an image is to be copied or printed for a number of times, if identification data of image processing apparatuses that have copied or printed the image can be incrementally embedded in the image, traceability of the image can be realized thereby assuring reliability of the image.

SUMMARY OF THE INVENTION

It is an object of the present invention to at least partially solve the problems in the conventional technology.

According to an aspect of the present invention, there is provided an image processing apparatus including an image acquiring unit that acquires an original image data containing first data being encoded data indicative of first additional information; and a data processing unit that edits the first data in the original image data thereby generating edited original image data, and outputs the edited original image data.

According to another aspect of the present invention, there is provided an image processing method including acquiring an original image data containing first data being encoded data indicative of first additional information; and editing the first data in the original image data thereby generating edited original image data, and outputting the edited original image data.

According to still another aspect of the present invention, there is provided a computer program product including a computer usable medium having computer readable program codes embodied in the medium that, when executed, causes an image processing apparatus to execute the above image processing method.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings.

Figure 1:
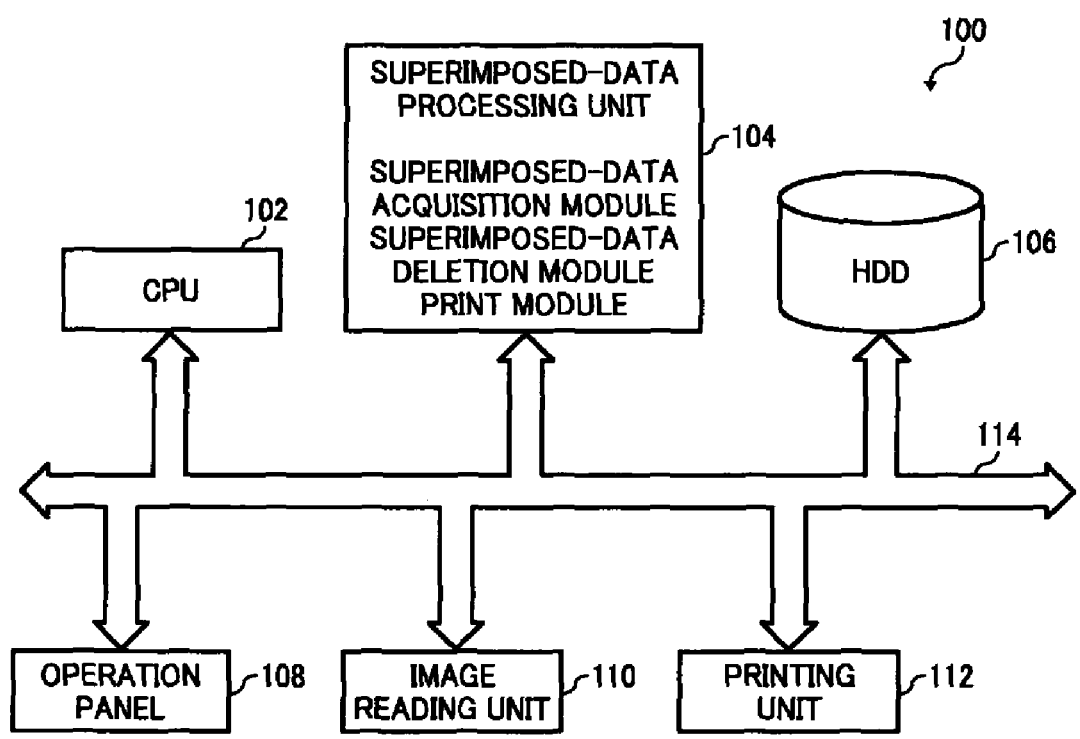
FIG. 1 is a functional block diagram of an image processing apparatus according to a first embodiment of the present invention.

FIG. 1 is a functional block diagram of an image processing apparatus 100 according to a first embodiment of the present invention. The image processing apparatus 100 includes a central processing unit (CPU) 102 that manages processes performed by the image processing apparatus 100. The image processing apparatus 100 performs various functions, such as a copying function or a facsimile function, in response to commands or data received from a user via an operation panel 108 that serves as a user interface (I/F). An image reading unit 110 of the image processing apparatus 100 includes a charge coupled device (CCD), and acquires an original image by scanning the original image placed in the image processing apparatus 100 or from other apparatuses via a network. If the image processing apparatus 100 has the facsimile function, an original image is generated from data received via a facsimile communication. In some cases, an original image contains additional information superimposed on the original image to be output.

Upon acquisition of an original image, the image processing apparatus 100 runs a superimposed-data processing unit 104. The superimposed-data processing unit 104 includes a superimposed-data acquisition module, a superimposed-data deletion module, and a print module. The superimposed-data processing unit 104 determines whether superimposed data is present in the original image. If the superimposed data is present in the original image, the superimposed-data processing unit 104 performs an editing process for deleting the superimposed data. An image obtained after completing the editing process is formed into output-target data in page description language (PDL) format or the like. A printing unit 112 of the image processing apparatus 100 then outputs the output-target data as a printed object. The printing unit 112 includes photosensitive elements, a developer, a charging unit, a fixing unit, and the like. Functional units of the image processing apparatus 100 are connected to one another via a bus line 114, enabling transmission and reception of commands and data with one another.

The original image acquired by the image reading unit 110 is stored in a storage device, such as a hard disk drive (HDD) 106 of the image processing apparatus 100, together with an image identification data to be used for other processes. The HDD 106 also stores therein additional information for embedding information such as user information, data on the number of times of copying, and copying log data in a background of a printed object. In addition, the image processing apparatus 100 can cause the HDD 106 to store the additional information acquired from superimposed data together with data on date and the like in the HDD 106 as log data. The additional information can be stored in the HDD 106 in any formats, such as binary digit and text data. The additional information is converted into binary digit, and then encoded as image data, resulting in superimposed data. That superimposed data is added to the original image, so that output-target data is generated.

The superimposed data can be formed in various formats, such as bitmap, Graphics Interchange Format (GIF), Tagged Image File Format (TIFF), Portable Network Graphics (PNG), Joint Photographic Experts Group (JPEG), JPEG2000, or Portable Document Format (PDF). In the first embodiment, the additional information is recognized from specific patterns of bit 0 and bit 1. The image processing apparatus 100 identifies superimposed data from a background of the original image, deletes the superimposed data from the original image, and performs processes described below.

Figure 2:
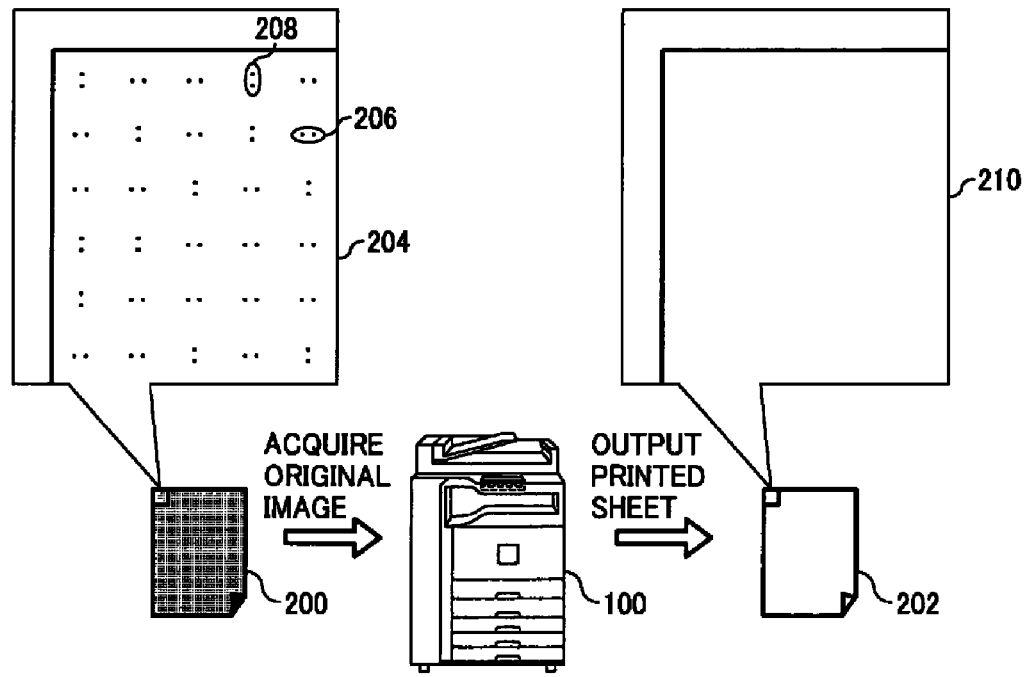
FIG. 2 is a schematic diagram for explaining a process performed by the image processing apparatus shown in FIG. 1.

FIG. 2 is a schematic diagram for explaining a process performed on an original image 200 and an output image 202 by the image processing apparatus 100. When the original image 200 is set on a platen of the image processing apparatus 100, the image reading unit 110 acquires image data from the original image 200. Additional information in specific patterns is added to a background of the original image 200. When the image processing apparatus 100 identifies predetermined patterns in the original image 200, the image processing apparatus 100 performs an identification process on a background image. In the example shown in FIG. 2, upon identifying patterns of additional information in a background image, the image processing apparatus 100 deletes the patterns from the background image, and outputs the output image 202. It is possible that the image processing apparatus 100 decodes identified additional information and registers that additional information as one of log data to improve traceability of a printed object.

As shown in FIG. 2, patterns 206 and 208 each formed by a pair of dots are present in a printable area 204 of the original image 200. The pattern 206 includes horizontally arranged two dots with a predetermined interval therebetween, and the pattern 208 includes perpendicularly arranged two dots with a predetermined interval therebetween. One of the patterns 206 and 208 is identified as bit 0 while the other is identified as bit 1 by the image processing apparatus 100. Additional information can be added to a background image in a decodable manner by assigning binary digits to visually identifiable two patterns.

Any visually identifiable patterns can be used instead of use of the dots in the patterns 206 and 208 as shown in FIG. 2. Examples of visually identifiable patterns include patterns formed by slash or backslash. If the patterns 206 and 208 are formed by dots, the size of each dot can be one pixel size. Consequently, it is possible to arrange the patterns so that the patterns are faintly embedded as a background image with respect to other images in an original image. The patterns 206 and 208 can be superimposed on the original image in addition to other faint background patterns that do not contain additional information. In this case, the image processing apparatus 100 generates an output-target image with the other faint background patterns but without the patterns 206 and 208.

The patterns are arranged with appropriate intervals kept between each other so that plurality of pieces of additional information can be encoded without overlapping of the patterns. For example, the patterns can be horizontally arranged in ten lines with appropriate intervals. If a piece of additional information is to be added, the additional information can be embedded in one of the ten lines. When another piece of additional information is added, that additional information is embedded in one of nine lines, which is the rest of the ten lines. Accordingly, it is possible to register ten different pieces of additional information on that ten patterns. It is also possible to apply similar encoding process to perpendicularly arranged patterns.

The image processing apparatus 100 identifies patterns on an original image, deletes the patterns from the original image, generates output-target data, and causes the printing unit 112 to output the output-target data. Accordingly, an output image 210 with the patterns 206 and 208 deleted from the printable area 204 is acquired. Thus, it is possible to acquire a clear image that does not contain background images. The image processing apparatus 100 decodes output log of an original image containing date, identification data of output devices, a name of a user who has output an image, and the like from arrays of the patterns 206 and 208, and records decoded information as log data or the like. As a result, it is possible to improve traceability of objects output from the image processing apparatus 100. If the image processing apparatus 100 receives data via a facsimile function, it is possible to perform a process of deleting superimposed data, such as barcodes or quick response (QR) codes contained in received data.

Figure 3:
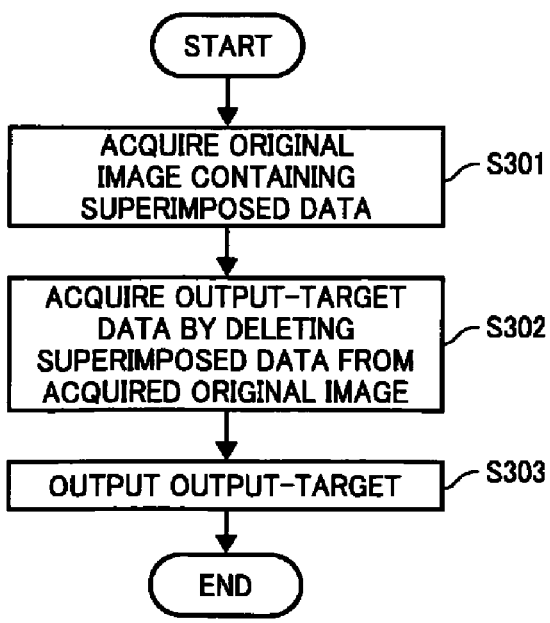
FIG. 3 is a flowchart of a process procedure performed by the image processing apparatus shown in FIG. 1.

FIG. 3 is a flowchart of a process procedure performed by the image processing apparatus 100. The image processing apparatus 100 reads an original data or restores facsimile data thereby acquiring an original image (step S301). The image processing apparatus 100 identifies superimposed data present in the acquired original image, and retrieves the superimposed-data deletion module from the superimposed-data processing unit 104 to delete the superimposed data by changing color values of corresponding pixels in the original image to color values of a background image, thereby acquiring a target image data to be output, which is stored in a memory as output-target data (step S302).

The superimposed data can be identified by various methods. For example, it is possible to uniformly set a pixel position where superimposed data is added with respect to each image size, so that the image processing apparatus 100 can identify superimposed data by acquiring patterns from an acquired image. Furthermore, a method is also possible, in which every time a dot with one pixel size is identified, an adjacent area of the dot is searched to determine whether dots are present in positions corresponding to patterns. If other images are present in the searched adjacent area, it is possible to temporarily assume that dots corresponding to patterns are present in the area, and perform search on the same line to retrieve other patterns. Then, upon retrieval of other patterns, the image processing apparatus 100 decodes the superimposed data and obtains additional information in the superimposed data as binary digit.

Intervals between dots can be fixed. Alternatively, intervals can be determined by the image processing apparatus 100 when superimposed data is encoded in such a manner that intervals are set wider than a line width of a font to be output or a line width of a faint background pattern. In this case, it is possible to reduce the number of patterns to be completely covered by a text on an output image. Thus, it is possible to identify superimposed data more precisely.

Moreover, it is possible to add the total number of dots of superimposed data to the superimposed data as a check sum. Specifically, a threshold based on texts or a faint background, and a ratio of dots overlapping with the texts or the like is previously set, and the superimposed data is deleted by changing color values of dots of identified superimposed data to the threshold.

The image processing apparatus 100 retrieves the print module from the superimposed-data processing unit 104, converts the format of the output-target data into an appropriate format such as PDL, and then sends the output-target data to the printing unit 112 to cause the printing unit 112 to print the output-target data (step S303), and process control ends.

Figure 4A:
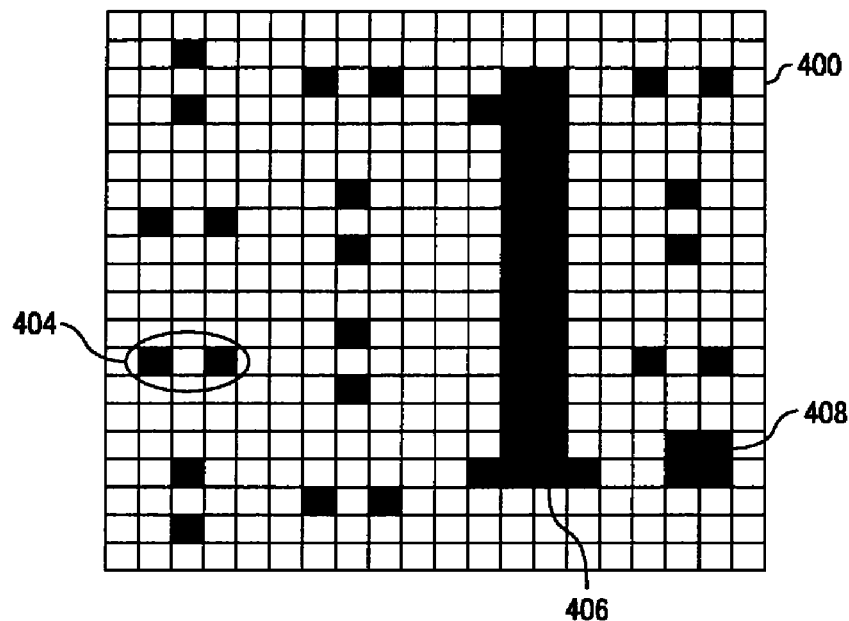
FIGS. 4A and 4B are schematic diagrams for explaining a process of deleting dot patterns performed by the image processing apparatus shown in FIG. 1.
Figure 4B:
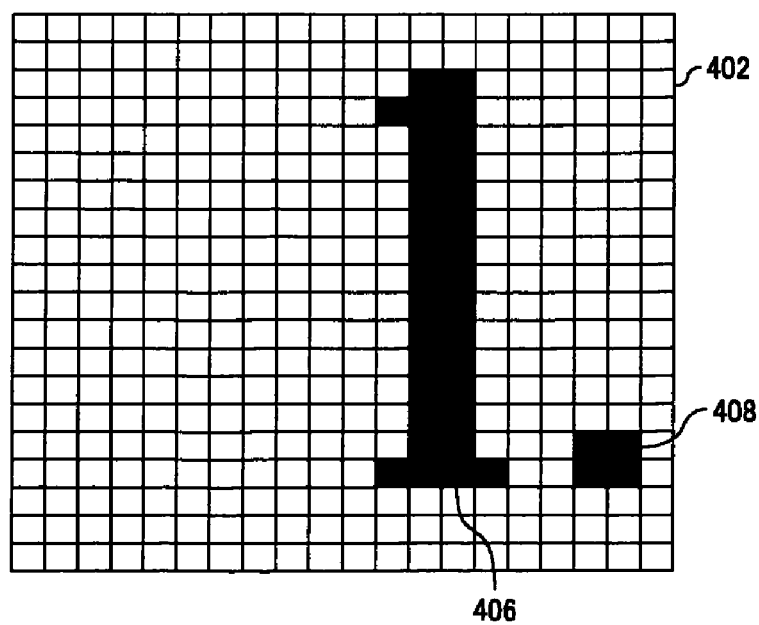

FIGS. 4A and 4B are schematic diagrams for explaining a process of deleting dots of the patterns 206 and 208 performed at step S302. As shown in FIG. 4A, patterns 404 are present as superimposed data in an image 400 containing additional information. Each of the patterns 404 is formed by two dots each having one pixel size, and arranged so that dots are aligned either horizontally or perpendicularly around output-target data 406 and 408. The image processing apparatus 100 identifies dots each having one pixel size from an acquired image, searches a predetermined adjacent area of each of the dots, and sequentially determines whether each of the dots forms a pattern.

The image processing apparatus 100 sets color values of identified dots to color values of a background image, and completes deletion of the dots to form an output image 402 shown in FIG. 4B. In the output image 402, the output-target data "1." is clearly depicted without background patterns. At this time, the image processing apparatus 100 can decode the patterns acquired as the superimposed data thereby acquiring additional information, and store the additional information in log data as print log.

Figure 5:
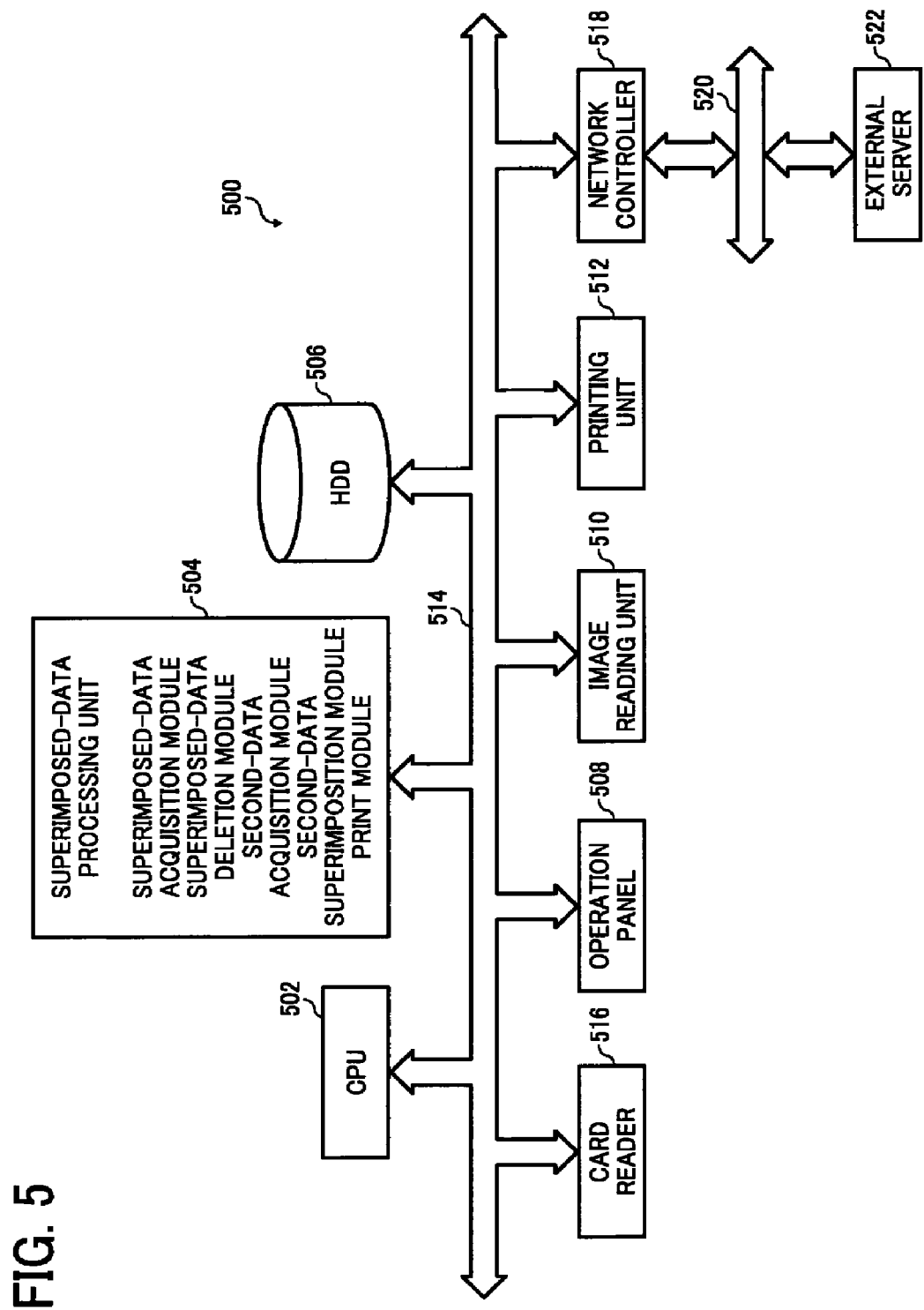
FIG. 5 is a functional block diagram of an image processing apparatus according to a second embodiment of the present invention.

FIG. 5 is a functional block diagram of an image processing apparatus 500 according to a second embodiment of the present invention. The image processing apparatus 500 is configured in the similar manner as the image processing apparatus 100. Functional units of the image processing apparatus 500 are connected to one another via a bus line 514, enabling transmission and reception of commands and data with one another. The image processing apparatus 500 is controlled by a CPU 502. The image processing apparatus 500 includes a card reader 516 in addition to the configuration of the image processing apparatus 100. The card reader 516 reads an integrated circuit (IC) card or the like to acquire user identification information and the like when a user accesses the image processing apparatus 500. When an original image is set on a platen of the image processing apparatus 500 and a user sends a command for reading the image via an operation panel 508, an image reading unit 510 acquires an original image. The image processing apparatus 500 identifies and deletes superimposed data (first superimposed data) present in the original image in a similar manner as described in the first embodiment thereby generating an intermediate image.

The image processing apparatus 500 acquires additional information indicative of acquired user identification information from an HDD 506 or the like, encodes the additional information as second superimposed data, adds the second superimposed data as a background image to the intermediate image, and prints the intermediate image with the second superimposed data added thereto.

The image processing apparatus 500 also includes a network controller 518. The image processing apparatus 500 transmits/receives e-mail or data to/from an external server 522 via a network 520 of Ethernet (registered trademark) through the network controller 518, and then outputs data. The image processing apparatus 500 can previously prepare patterns of additional information such as internet protocol (IP) address for identifying that a printed object has been output via a network.

The image processing apparatus 500 also includes a superimposed-data processing unit 504 that executes processes described above. The superimposed-data processing unit 504 includes a superimposed-data acquisition module, a superimposed-data deletion module, a second-data acquisition module, a second-data superimposition module, and a print module. The superimposed-data acquisition module and the superimposed-data deletion module can be configured in the same manner as those described in the first embodiment. The second-data acquisition module reads an additional information pattern of additional information, such as user identification information and identification data of image processing apparatus, to be superimposed on an output image from the additional information patterns registered in the HDD 506, and then buffers read additional information patterns.

The second-data superimposition module then converts the user identification information and the like into binary digits, encodes the user identification information and the like as second superimposed data, generates a background image of encoded patterns in PDF format or the like, adds the second superimposed data as the background image to image data where first superimposed data has been deleted, and generates output-target data. The print module sends the output-target data with the second superimposed data to a printing unit 512, and causes the printing unit 512 to output the output-target data as a printed object. It is possible to set the external server 522 instead of the printing unit 512 as an output destination of a print module so that the output-target data is transferred to the external server 522 via the network 520.

Figure 6:
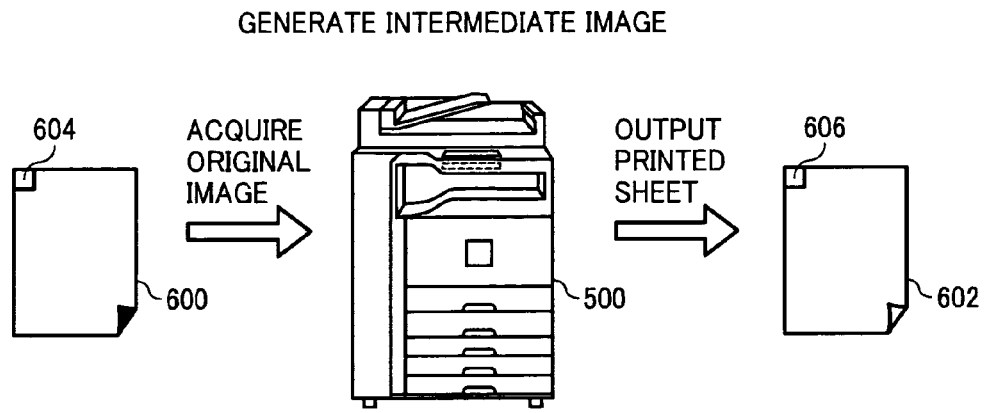
FIG. 6 is a schematic diagram for explaining a process performed by the image processing apparatus shown in FIG. 5.

FIG. 6 is a schematic diagram for explaining a process performed by the image processing apparatus 500. First superimposed data 604 generated by encoding first additional information is present as a background image of an original image 600 to be output. The image processing apparatus 500 causes the image reading unit 510 to acquire the original image 600, identifies the first superimposed data, and acquires the additional information from the first superimposed data. The image processing apparatus 500 then decodes the first superimposed data, and acquires various additional information from the first superimposed data. The image processing apparatus 500 deletes identified first superimposed data, and retrieves a target image to be output.

The image processing apparatus 500 reads data, such as user identification information, to be added to a target image from the HDD 506 or the like, encodes read data as second superimposed data 606, and outputs an output image 602 with the second superimposed data 606 added. The first and the second superimposed data can be dot patterns as described in the first embodiment. Alternatively, it is possible to use encoded patterns, such as barcodes or QR codes, locally arranged in the original image and the output image.

Figure 7:
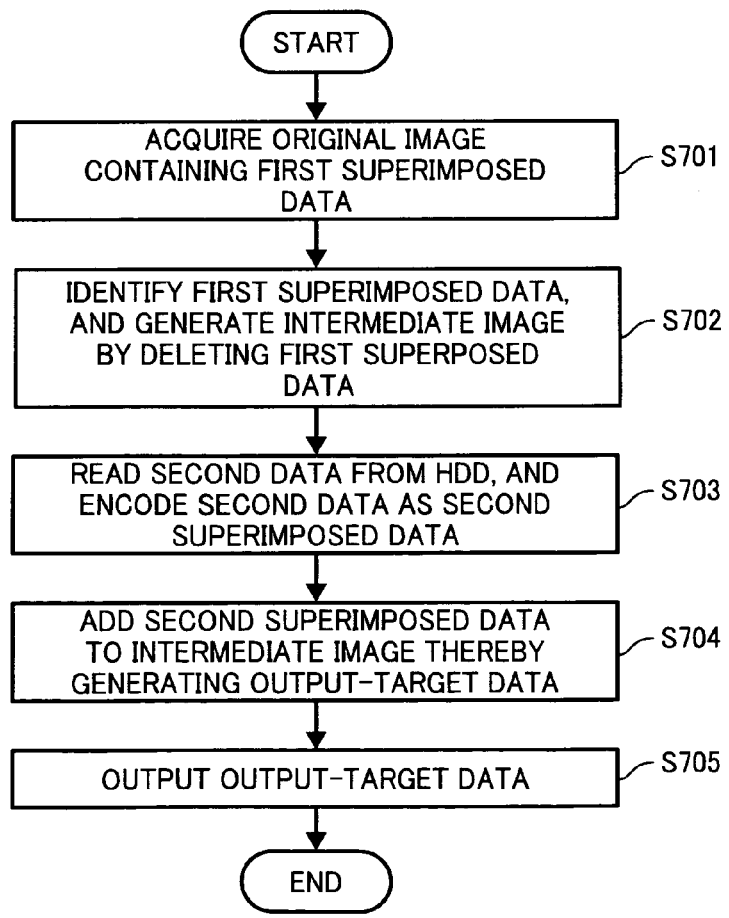
FIG. 7 is a flowchart of a process procedure performed by the image processing apparatus shown in FIG. 5.

FIG. 7 is a flowchart of a process procedure performed by the image processing apparatus 500. The image processing apparatus 500 acquires an original image containing the first superimposed data (step S701). The image processing apparatus 500 identifies the superimposed data, and deletes the first superimposed data, thereby generating the intermediate image (step S702). The image processing apparatus 500 then reads the additional information, such as date of acquisition of an image, a user identification data of a user who has copied the image, or data on an image forming apparatus, from the HDD 506 or the like, encodes the read additional information, and generates a background image to be used as the second superimposed data (step S703).

If the image processing apparatus 500 cannot identify the first superimposed data at step S702, process control proceeds to step S703 without performing other processes at step S702.

The image processing apparatus 500 adds the second superimposed data as a background image to the intermediate image in which the first superimposed data has been deleted thereby generating the output-target data containing the second superimposed data (step S704). Then, the image processing apparatus 500 outputs the output-target data (step S705), and process control ends.

As described above, the image processing apparatus 500 can edit the background image and improve traceability of the output image.

Figure 8:
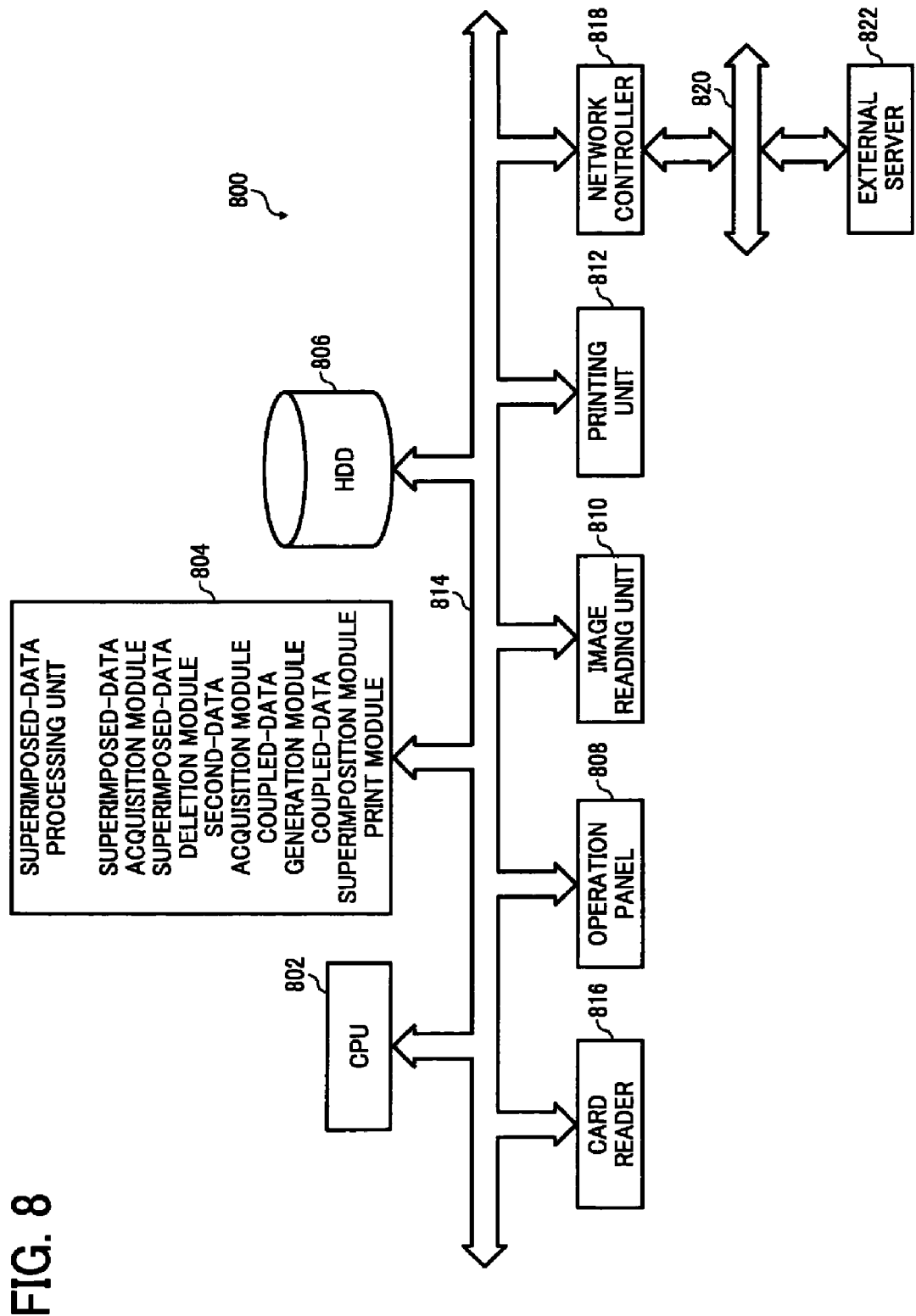
FIG. 8 is a functional block diagram of an image processing apparatus according to a third embodiment of the present invention.

FIG. 8 is a functional block diagram of an image processing apparatus 800 according to a third embodiment of the present invention. The image processing apparatus 800 is configured in the similar manner as the image processing apparatus 500. The image processing apparatus includes a CPU 802, a superimposed-data processing unit 804, an HDD 806, an operation panel 808, an image reading unit 810, a printing unit 812, a card reader 816, and a network controller 818. Functional units of the image processing apparatus 800 are connected to one another via a bus line 814, enabling transmission and reception of commands and data with one another. The image processing apparatus 800 transmits/receives e-mail or data to/from an external server 822 via a network 820 of Ethernet (registered trademark). A configuration of the superimposed-data processing unit 804 of the image processing apparatus 800 is different from that of the superimposed-data processing unit 504. The superimposed-data processing unit 804 includes a superimposed-data acquisition module, a superimposed-data deletion module, a second-data acquisition module, a coupled-data generation module, a coupled-data superimposition module, and a print module.

The coupled-data generation module couples newly acquired second additional information with first additional information acquired by decoding first superimposed data to generate second superimposed data (hereinafter, "coupled data") based on the first and the second additional information. Two pieces of additional information can be coupled and encoded with each other in such a manner that the second additional information is to be arranged in a position shifted from a pixel position of the first additional information in a predetermined pixel direction, and then coupled data is encoded as superimposed data.

The above described method can be used for embedding additional information as a digital watermark in output-target data. It is also possible to use a method of encoding and embedding two pieces of additional information in predetermined different methods. For example, it is possible to encode and embed the first additional information as patterns, and the second additional information as a digital watermark in the output-target data.

Figure 9:
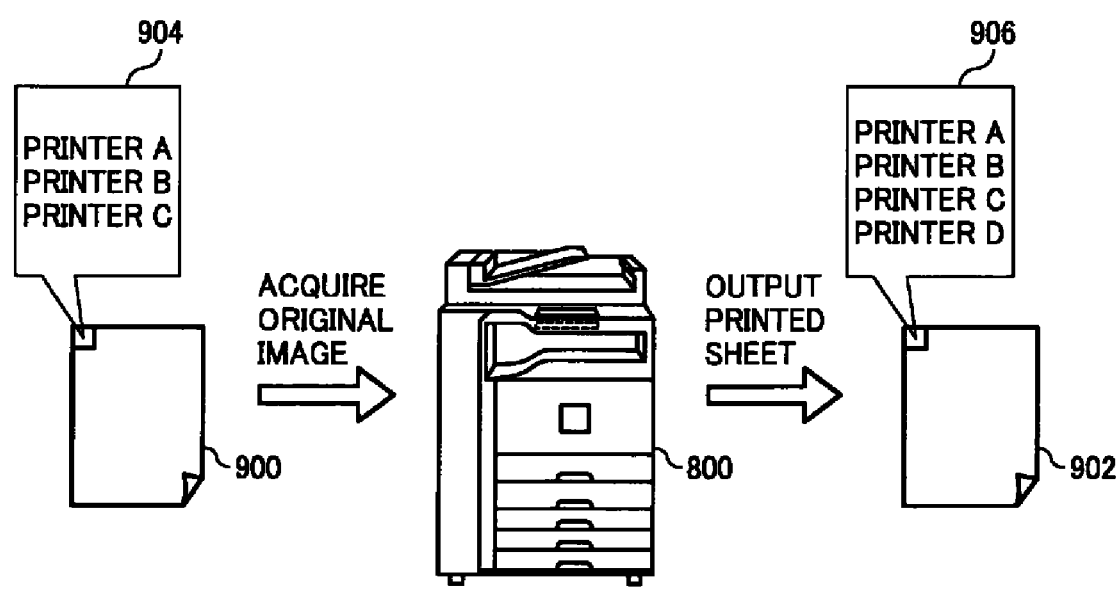
FIG. 9 is a schematic diagram for explaining a process performed by the image processing apparatus shown in FIG. 8.

FIG. 9 is a schematic diagram for explaining a process performed by the image processing apparatus 800. First additional information 904 indicative of a print log indicating that an original image 900 has been copied three times by printers A, B, and C is embedded in the original image 900. Furthermore, the image processing apparatus 800 is previously identified as a printer D. The image processing apparatus 800 causes the image reading unit 810 to acquire the original image 900 by scanning the original image 900 placed in the image processing apparatus 800. The image processing apparatus 800 then decodes and acquires the first additional information 904 embedded in a background image of the original image 900. The image processing apparatus 800 deletes dots corresponding to the first additional information 904 from the original image 900 to generate an intermediate image. Then, the image processing apparatus 800 reads its identification information, i.e., data of the printer D, from the HDD 806, converts acquired identification information into binary digits, and generates the coupled data as a dot pattern by previously set encoding method based on the binary digits and the first additional information 904.

The coupled data is used as a background image to be added to the intermediate image for generating output-target data. The image processing apparatus 800 then prints out an output image 902 containing coupled data 906 with identification data of the printer D.

The first and the second additional information can be embedded in the output image as a digital watermark. For embedding superimposed data as a digital watermark in an original image, the digital watermark is added as dot patterns by using encoding methods corresponding to copying log or print log. For adding additional information as a digital watermark to the original image, it is not necessary to delete additional information that has been added to the original image to generate an intermediate image.

Figure 10:
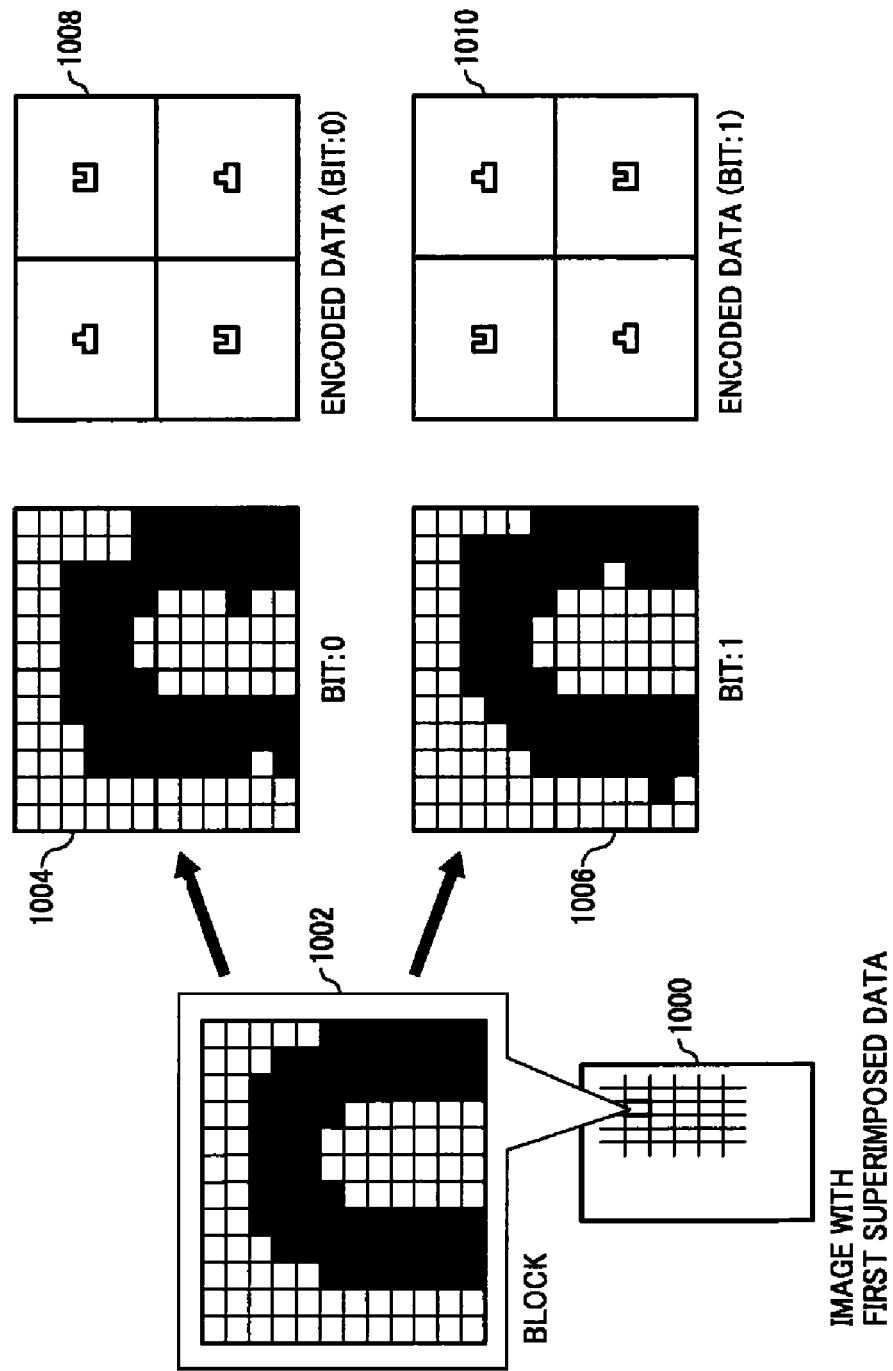
FIG. 10 is a schematic diagram for explaining a process of adding a digital watermark to an image performed by the image processing apparatus shown in FIG. 8.

FIG. 10 is a schematic diagram for explaining a process of adding additional information as a digital watermark to an original image 1002. For forming a digital watermark of additional information, a mesh is overlapped on a printable area 1000 of the original image 1002, which is divided into four areas for each of which one of encoded data 1008 indicative of bit 0 and encoded data 1010 indicative of bit 1 is assigned.

The image processing apparatus 800 analyzes the acquired original image 1002. For each divided area of an original image-overlapped by the mesh, when a target pixel is set as a convex specification, the image processing apparatus 800 shifts an edge dot of the image outward by one pixel in accordance with encoded data specified on that divided area, and sets color values of the edge dot to color values of the background image. Similarly, when encoded data assigned to each of the divided areas is set as a concave specification, color values of one pixel of an edge dot of the image is set to color values of the background image. Additional information generated in the above manner is superimposed on the image as a digital watermark.

With this process, an image 1004, in which bit 0 is added to the original image 1002, and an image 1006, in which bit 1 is added to the original image 1002, are generated as output-target data. The position of the pixel to be corrected is not limited to the edge dot, and any pixel position set by any encoding methods can be used. In this case, it is possible to effectively perform a process of adding a digital watermark because dots described in the first embodiment are generated individually from the image, and any processes are not performed on pixels set as the concave specification.

For coupling digital watermarks, pixel positions to be corrected for identified additional information in each of the divided areas are sequentially changed. For example, a center pixel is corrected for the first additional information, and a pixel on the right side of the center pixel is corrected for the second additional information, so that each of the additional information can be identified. Furthermore, it is possible to change pixel positions to be corrected on a diagonal line of each of the divided areas from the first additional information to n-th additional information. If an image is not present in a divided area, and a pixel is set as the concave specification, the image processing apparatus 800 continues the process based on assumption that pixel corresponding to additional information is set in a specified position. If an image is not present in a divided area, and a pixel is set as the convex specification, even the pixel is not an edge dot, a dot of one pixel size is added to a position specified by encoded data to increase identifiability of additional information.

Figure 11:
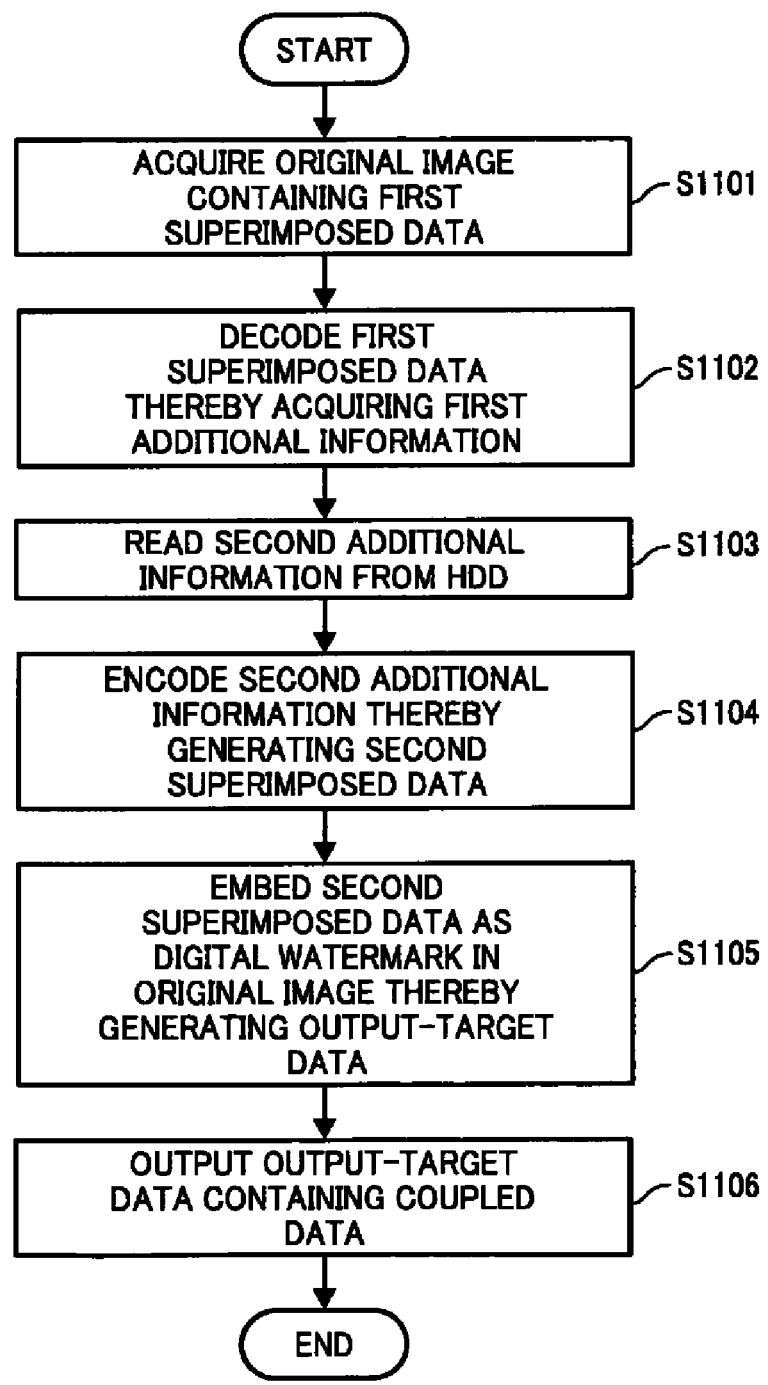
FIG. 11 is a flowchart of a process procedure performed by the image processing apparatus shown in FIG. 8.

FIG. 11 is a flowchart of a process procedure performed by the image processing apparatus 800. The image processing apparatus 800 reads an original image in which the first additional information is embedded as a digital watermark, or acquires an original image by restoring facsimile data. In the flowchart of FIG. 11, the image processing apparatus 800 acquires a digital watermark (an original image) (step S1101). The image processing apparatus 800 decodes the digital watermark, thereby acquiring the first additional information (step S1102). Then, the image processing apparatus 800 reads the second additional information from the HDD 806 or the like and buffers the second additional information (step S1103).

The image processing apparatus 800 encodes the second additional information, thereby generating second superimposed data (step S1104). When the first and the second additional information are superimposed as digital watermarks, the first and the second superimposed data are coupled with each other without deleting a digital watermark of the first additional information. Specifically, the image processing apparatus 800 refers to encoded data for the second superimposed data, and shifts a position where the second superimposed data is to be coupled with the first superimposed data in the divided areas.

The image processing apparatus 800 embeds the second superimposed data as a digital watermark in the original image thereby generating output-target data (step S1105). Then, the image processing apparatus 800 sends the output-target data containing coupled data to the printing unit 812. Upon reception of the coupled data, the printing unit 812 outputs the coupled data as a printed object (step S1106), and then process control ends.

When the first superimposed data is superimposed as a background image, the first and the second superimposed data can be coupled with each other by various methods. Specifically, the image processing apparatus 800 identifies the first superimposed data, deletes the first superimposed data from the original image, and generates an intermediate image. Then, the image processing apparatus 800 generates coupled data in which the first and the second additional information are coupled with each other, encodes the coupled data, superimposes the coupled data on the intermediate image, and generates output-target data.

The superimposed data can be coupled with each other without generating the intermediate image. Specifically, the second superimposed data is individually encoded from the second additional information, and the second superimposed data is added to a position shifted by pixels of predetermined dots from a position of a dot pattern of the first superimposed data. As a result, the first and the second superimposed data are coupled with each other. The coupled data is then superimposed on the original image, so that output-target data containing the coupled data can be generated.

As described above, according to embodiments of the present invention, it is possible to delete, add, and couple pieces of additional information, such as user identification, the number of times of copying, and copying log, in accordance with output processes performed by an image processing apparatus. Therefore, it is possible to improve traceability, copy protectability, security of a printed object, resulting in improving identifiability of the printed object.

The functions of the embodiments described above can be realized by computer-executable programs configured by legacy programming languages, or object-oriented languages. Examples of applicable languages include assembler, C, C++, Java (registered trademark), Java Beans, Java Applet, Java Script, Perl, and Ruby. The computer programs can be distributed by using a computer readable recording medium.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
an image acquiring unit configured to acquires an original image data containing first data being encoded data indicative of first additional information; and
a data processing unit configured to edits the first data in the original image data thereby generating edited original image data, and outputs the edited original image data, wherein the data processing unit is configured to decode the first data thereby acquiring the first additional information, generates coupled data by coupling second additional information to the first additional information, encode the coupled data, and add encoded coupled data to the edited original image data, and wherein the first additional information includes a log of one or more devices which have copied the original image data, and the second additional information includes identification information identifying the image processing apparatus.

2. The image processing apparatus according to claim 1, wherein the data processing unit deletes the first data.

3. The image processing apparatus according to claim 1, wherein the data processing unit deletes the first data and adds second data being encoded data indicative of second additional information to the edited original image data.

4. The image processing apparatus according to claim 1, wherein the first data is one of a background image data of the original image data and a digital watermark.

5. The image processing apparatus according to claim 1, wherein the image acquiring unit acquires the original image data by reading an original.

6. An image processing method comprising:

acquiring an original image data containing first data being encoded data indicative of first additional information; and editing the first data in the original image data thereby generating edited original image data, and outputting the edited original image data, wherein the editing includes decoding the first data thereby acquiring the first additional information, generating coupled data by coupling second additional information to the first additional information, encoding the coupled data, and adding encoded coupled data to the edited original image data, and wherein the first additional information includes a log of devices which have copied the original image data, and the second additional information includes identification information identifying the image processing apparatus.

7. The image processing method according to claim 6, wherein the editing includes deleting the first data.

8. The image processing method according to claim 6, wherein the editing includes deleting the first data; and adding second data being encoded data indicative of second additional information to the edited original image data.

9. The image processing method according to claim 6, wherein the first data is one of a background image data of the original image data and a digital watermark.

10. The image processing method according to claim 6, wherein the acquiring includes acquiring the original image data by reading an original.

11. A computer program product comprising a non-transitory computer usable medium having computer readable program codes embodied in the medium that, when executed, causes an image processing apparatus to execute:

acquiring an original image data containing first data being encoded data indicative of first additional information; and editing the first data in the original image data thereby generating edited original image data, and outputting the edited original image data, wherein the editing includes decoding the first data thereby acquiring the first additional information, generating coupled data by coupling second additional information to the first additional information, encoding the coupled data, and adding encoded coupled data to the edited original image data, and wherein the first additional information includes a log of devices which have copied the original image data, and the second additional information includes identification information identifying the image processing apparatus.

12. The computer program product according to claim 11, wherein the editing includes deleting the first data.

13. The computer program product according to claim 11, wherein the editing includes deleting the first data; and adding second data being encoded data indicative of second additional information to the edited original image data.

14. The computer program product according to claim 11, wherein the first data is one of a background image data of the original image data and a digital watermark.

\* \* \* \* \*